United States Patent
Tseng et al.

(10) Patent No.: US 8,174,281 B2
(45) Date of Patent: May 8, 2012

(54) METHOD AND CIRCUIT FOR TRACKING MAXIMUM POWER OF A PHOTO-VOLTAIC ARRAY

(75) Inventors: Sheng-Yu Tseng, Guishan Township (TW); Ying-Jhih Wu, Guishan Township, Taoyuan County (TW); Kuo-Chi Liu, Hsinchu (TW)

(73) Assignee: Richtek Technology Corp., ChuPei (TW)

( * ) Notice: Subject to any disclaimer, the term of this patent is extended or adjusted under 35 U.S.C. 154(b) by 301 days.

(21) Appl. No.: 12/701,445

(22) Filed: Feb. 5, 2010

(65) Prior Publication Data
US 2011/0043187 A1    Feb. 24, 2011

(30) Foreign Application Priority Data
Aug. 20, 2009  (TW) ................. 98128099 A

(51) Int. Cl.
*G01R 31/26*   (2006.01)
*H01M 10/44*   (2006.01)
*H02J 7/00*    (2006.01)
*H02J 7/04*    (2006.01)
*H01L 31/00*   (2006.01)
*H01L 31/042*  (2006.01)
*C12Q 1/68*    (2006.01)

(52) U.S. Cl. .............. 324/761.01; 320/101; 320/137; 320/145; 136/252; 136/244; 250/200

(58) Field of Classification Search .......... 324/761.01
See application file for complete search history.

(56) References Cited

U.S. PATENT DOCUMENTS
6,255,804 B1 *  7/2001  Herniter et al. ........... 320/137
6,844,739 B2 *  1/2005  Kasai et al. .............. 324/611
* cited by examiner

*Primary Examiner* — Roberto Velez

(57) ABSTRACT

A method and a circuit for tracking maximum power of a photo-voltaic array performs the operation of load increase/decrease with a preset current difference and determines if the photo-voltaic array operates at zone A or zone B based on change of the output voltage before and after the operation to decide the next operation being for load increase or load decrease. It is not necessary for tracking the maximum power with the multiplier to estimate the output power of the photo-voltaic array. Therefore, the circuit for tracking the maximum power of the photo-voltaic array is capable of being simplified and joined to the pulse width modulation circuit to form an integrated circuit with a function of tracking the maximum power.

10 Claims, 9 Drawing Sheets

METHOD AND CIRCUIT FOR TRACKING MAXIMUM POWER OF A PHOTO-VOLTAIC ARRAY

BACKGROUND OF THE INVENTION

1. Field of the Invention

The present invention is related to application of a photo-voltaic array and particularly to a method and a circuit for tracking the maximum power of the photo-voltaic array.

2. Brief Description of the Related Art

Nowadays, development of the renewable energy source such as the solar power has become a great trend for pursuing the green energy along with the petrochemistry energy exhausted. Hence, the solar power system has been widely applied to the home appliances, the communication system, the traffic light and illumination system.

Referring to FIG. 1, the application of solar power system generally is to convert the solar energy to the electric energy with a photo-voltaic array 11 and the electric energy is supplied to the load 13 with the converter 12 or the inverter. In order to improve the efficiency of the photo-voltaic array 11, the maximum power tracking circuit 15, which includes the maximum power tracking unit 151, the current control unit 152, the pulse width modulation unit 153, and the gate driving unit 154, is employed to control the photo-voltaic array 11 operating on the maximum power point (MPP).

Referring to FIG. 2, the photo-voltaic characteristic curve of the conventional photo-voltaic array is illustrated. It can be seen in FIG. 2 that the output power $P_{PV}$ of the photo-voltaic array increases along with increase of the output illumination in case of the different solar illuminations; the output power $P_{PV}$ of the photo-voltaic array is divided into zone A and zone B according to the maximum power point $P_{MAX}$ shown in FIG. 2 in case of the same solar illumination. When the photo-voltaic array is operated at zone A, the output power $P_{PV}$ of the photo-voltaic array increases along with increase of the output voltage $V_{PV}$ of the photo-voltaic array; when the photo-voltaic array is operated at zone B, the output power $P_{PV}$ of the photo-voltaic array increases along with decrease of the output voltage $V_{PV}$ of the photo-voltaic array.

Therefore, the conventional way to track the maximum power of the photo-voltaic array is a method of perturbation and observation, and FIG. 3 illustrates how the method of perturbation and observation is operated. The solid line shown in FIG. 3 represents the photo-voltaic characteristic curve with the identical illumination; the dash line above the solid line represents the power operation curve at the time of load increase; the dash line under the solid line represents the power operation curve at the time of load decrease.

When the photo-voltaic array is operated at zone B, it is supposed that the load power increases to C11 from D1 shown in FIG. 3 and the load power should be equal to the output power of the photo-voltaic array such that the actual work point parallel moves toward the solid line and operates at point D2. Similarly, when the load power continues increasing and moves toward C12 from D2 shown in FIG. 3, the working point of the photo-voltaic array parallel moves toward D3 from C12. And so on, when the load power continues to increase to point C1(*m*−1), the output power of the photo-voltaic array is equal to the load power, and the photo-voltaic array is operated at the maximum point $D_M$.

Under this circumference, if the load is increased continuously to point C1*m* in FIG. 3, the operation for the photo-voltaic array is changed to zone A and the actual operation voltage should be the same as the output voltage of the photo-voltaic array, or the load end voltage is proportional to the output voltage $V_{PV}$ of the photo-voltaic array with a value of $K_V$ ($K_V$ is a transfer function of the output voltage of the converter with respect to the input voltage) at the time of the load power increasing to point C1*m*; according to the transfer relationship between the load end voltage and the output voltage $V_{PV}$ of the photo-voltaic array, point Dm+1 on the photo-voltaic characteristic curve can be found corresponding to C1*m*. In FIG. 3, it is supposed that $K_V$ is equal to 1 and the load end voltage is equal to the output voltage $V_{PV}$ of the photo-voltaic array such that the actual working point on the photo-voltaic array moves vertically toward the solid line and operates at point Dm+1. Similarly, when the load increases continuously, the actual working point of the photo-voltaic array moves to Dn from Dm gradually and finally moves to point O.

On the contrary, when the load power decreases to C2(*n*−1) from Dn on the photo-voltaic characteristic curve, it is supposed that $K_V$ is equal to 1 and the load end voltage is equal to the output voltage $V_{PV}$ of the photo-voltaic array such that the actual working point on the photo-voltaic array moves vertically toward the solid line and operates at point Dn−1. And so on, the working point of the photo-voltaic array moves toward the maximum power point Dm along with the load power decreasing, and when the load power continues decreasing, the working point of the photo-voltaic array moves toward D1 from Dm continuously.

Thus, the method of perturbation and observation applied by the maximum power tracking unit 151 shown in FIG. 1 is to detect changes of the output power $P_{PV}$ and the output voltage $V_{PV}$ before and after the operation of load increase/decrease and to determine if the photo-voltaic array is operated at zone A or zone B such that next operation being for load increase or decrease is decided for the working point of the photo-voltaic array moving toward the maximum power point $D_M$ and operating at the maximum power point $D_M$ finally or perturbing in the vicinity of the maximum power point $D_M$.

Referring to FIG. 4, a flowchart of the conventional method of the perturbation and observation for tracking the photo-voltaic array maximum power is illustrated. Step 41 is performed to detect the output voltage $V_{PV}$ ($V_n$) and the output current $I_{PV}$ ($I_n$) of the photo-voltaic array and to figure out the output power $P_{PV}$ ($P_n$) based on the detected output voltage $V_{PV}$ ($V_n$) and the output current $I_{PV}$ ($I_n$); then, step 411 is performed to determine changes of the output power $P_b$, $P_n$ of the photo-voltaic array between before and after the operation of load increase/decrease; when the output power of the photo-voltaic array after the operation of load increase/decrease is greater, step 412 is performed to determine changes of the output voltage $V_b$, $V_n$ of the photo-voltaic array between before and after the operation of load increase/decrease; when the output voltage of the photo-voltaic array after the operation of load increase/decrease is greater, it means that the photo-voltaic array is operated at zone A and step 413 should be performed to process the operation of load decrease via setting the operation command D=1, and when the output voltage of the photo-voltaic array after the operation of load increase/decrease is less, it means that the photo-voltaic array is operated at zone B and step 414 should be performed to process the operation of load increase via setting the operation command D=0.

On the contrary, in case of the output power after the operation of load increase/decrease being determined not greater in step 411, step 421 is performed to determine if the output power after the operation of load increase/decrease is less or keeps unchanging. If it is less, step 422 is performed to determine the changes of the output power $V_b$, $V_n$ of the photo-voltaic array between before and after the operation of load increase/decrease; when the output voltage of the photo-voltaic array after the operation of load increase/decrease is less, it means that the photo-voltaic array is operated at zone A and step 424 should be performed to process the operation of load decrease via setting the operation command D=1, and when the output voltage of the photo-voltaic array after the operation of load increase/decrease is greater, it means that the photo-voltaic array is operated at zone B and step 423 should be performed to process the operation of load increase via setting the operation command D=0.

If the output power of the photo-voltaic array keeps unchanging in step 421, step 431 is performed to determine the changes of the output power $V_b$, $V_n$ of the photo-voltaic array between before and after the operation of load increase/decrease; if there is no change, it means the photo-voltaic array has been operated at the maximum point and no operation of load increase/decrease is required. Afterwards, step 45 is performed respectively to renew the output power $P_n$ and the output voltage $V_n$ of the photo-voltaic array after the operation of load increase/decrease as the output power $P_b$ and the output voltage $V_b$ of the photo-voltaic array before the operation of load increase/decrease for the next round.

When the current control unit 152 in FIG. 1 receives the operation command of the maximum power tracking unit 151, and when the voltage $V_0$ of the load 13 is constant, a target load current $I_{REF}$ of the operation of load increase/decrease can be figured out based on the detected load current $I_0$ and the preset current difference $\Delta I$ so as to adjust cycling period signal $T_C$ and duty period signal $D_C$ of the pulse width modulation for the pulse width modulation unit 153 capable of generating required pulse width modulation signals $GD_1$~$GD_n$ and the gate driving unit capable of generating gate driving signals G1~Gn to drive the converter 12 such that the load current $I_0$ can be controlled to increase or decrease to the target load current $I_{REF}$ gradually as shown in FIG. 5.

It can be understood from the preceding description that the conventional maximum power tracking circuit 15 is employed to control the photo-voltaic array to operate at the maximum power point and the maximum power tracking unit 151 has to perform multiplication with the multiplier or accumulation with the adder to estimate the output power $P_{PV}$ of the photo-voltaic array, and it is necessary to adopt the register to store the voltage and the power of the previous round such that it not only results in hardware with complicated circuits but also is hard to be joined to the conventional pulse width modulation unit 153 for being constructed an integrated circuit chip with a function of tracking maximum power.

SUMMARY OF THE INVENTION

Accordingly, an object of the present invention is to provide a method and a circuit for tracking maximum power of a photo-voltaic array with which another calculating processes are applied to track the maximum power such that the tracking circuit is capable of being simplified and joined to the pulse width modulation circuit to form an integrated circuit with a function of tracking the maximum power.

In order to achieve the preceding object, a method for tracking maximum power of a photo-voltaic array according to the present invention is suitable for tracking a power of the photo-voltaic array supplied to a load; the method comprises following steps: first, detecting an output voltage of the photo-voltaic array before performing an operation of load increase/decrease; then, performing the operation of load increase/decrease based on a preset current difference; next, detecting the output voltage after performing the operation of load increase/decrease; wherein when the operation of load increase/decrease is for load increase with the output voltage detected after the operation being less than the output voltage before the operation with a value not less than a preset voltage difference during a preset time, a next operation is set for load increase; when the operation is for load increase with the output voltage detected after the operation being not less than the output voltage before the operation during the preset time, or the output voltage detected after the operation being less than the output voltage before the operation but still not reaching the preset voltage difference after the preset time, the next operation is set for load decrease; when the operation is for load decrease with the output voltage detected after the operation being greater than the output voltage before the operation with a value not less than the preset voltage difference during the preset time, the next operation is set for load decrease; when the operation is for load decrease with the output voltage detected after the operation being not greater than the output voltage before the operation during the preset time, or the output voltage detected after the operation being greater than the output voltage before the operation but still not reaching the preset voltage difference after the preset time, the next operation is set for load increase.

Wherein the preset current difference and the preset voltage difference are set to meet a following relationship:

$$\frac{V_{PV1}+\Delta V}{I_{PV1}} < \frac{\Delta V}{\Delta I} < \frac{V_{PV1}}{I_{PV1}+\Delta I}$$

and, in the preceding relationship, $V_{PV1}$ represents the output voltage of the photo-voltaic array, $I_{PV1}$ represents the output current of the photo-voltaic array, $\Delta V$ represents the preset voltage difference, and $\Delta I$ represents the preset current difference.

Wherein the preset time is set according to magnitude of the preset current difference and sensitivity of the photo-voltaic array, that is, the preset time being required to be at least greater than a value that the photo-voltaic array can timely respond and output a current different from the original output current the preset current difference when the operation of load increase/decrease is performed.

Wherein the operation of load increase/decrease comprises following steps: referencing to the preset current difference and the operation being load increase or decrease to figure out a cycling period of a pulse width modulation; detecting an output current of the photo-voltaic array; setting a duty period of the pulse width modulation based on the output current changing between 0 and a preset current peak value.

Wherein a step for figuring out the cycling period is to reference to the cycling period before the operation being performed and the preset current difference to add or deduct a time difference for updating the cycling period, and the time difference is time of an average of said output current exactly adding or deducting the preset current difference after the operation.

Further, a circuit for tracking a photo-voltaic array maximum power according the present invention is capable of generating a gate signal of a pulse width modulation with the gate signal controlling a gate driving unit to drive a converter for tracking a power of a photo-voltaic array supplying to a load, and the circuit comprises a maximum power tracking unit, a current control unit and a pulse width modulation unit, wherein the maximum power tracking unit detects an output voltage of the photo-voltaic array before an operation of load increase/decrease being performed, issues a command for performing the operation, and detects an output voltage of the photo-voltaic array after the operation of load increase/decrease being performed, wherein when the operation is for load increase and the output voltage detected after the operation being performed is less than the output voltage before the operation being performed with a value not less than a preset voltage difference during a preset time, next operation is set for load increase; when the operation is for load increase with the output voltage detected after the operation being performed being not less than the output voltage before the operation being performed during the preset time, or said output voltage detected after said operation being performed is less than the output voltage before said operation being performed but still not reaching said preset voltage difference after the preset time, the next operation is set for load decrease; when the operation is for load decrease with the output voltage detected after the operation being performed being greater than the output voltage before the operation being performed with a value not less than the preset voltage difference during the preset time, the next operation is set for load decrease; and when the operation is load decrease with the output voltage detected after the operation being performed being not greater than the output voltage before the operation being performed during the preset time, or the output voltage detected after the operation being greater than the output voltage before the operation being performed but still not reaching the preset voltage difference after the preset time, the next operation is set for load increase; the current control unit couples the maximum power tracking unit for generating a cycling period signal and a duty period signal according to an output current of the photo-voltaic array, a preset current difference and the operation; and the pulse width modulation unit couples the current control unit to generate the gate signal according to the cycling period signal and the duty period signal.

In the preferred embodiment of a circuit for tracking a photo-voltaic array maximum power according the present invention, the preset current difference and the preset voltage difference are set to meet the following relationship:

$$\frac{V_{PV1} + \Delta V}{I_{PV1}} < \frac{\Delta V}{\Delta I} < \frac{V_{PV1}}{I_{PV1} + \Delta I}$$

and, in the preceding relationship, $V_{PV1}$ represents the output voltage of the photo-voltaic array, $I_{PV1}$ represents the output current of the photo-voltaic array, $\Delta V$ represents the preset voltage difference, and $\Delta I$ represents the preset current difference.

In the preferred embodiment of a circuit for tracking a photo-voltaic array maximum power according the present invention, the preset time is set according to magnitude of the preset current difference and sensitivity of the photo-voltaic array, that is, the preset time being required to be at least greater than a value that the photo-voltaic array can timely respond and output a current different from the original output current the preset current difference when the operation of load increase/decrease is performed.

In the preferred embodiment of a circuit for tracking a photo-voltaic array maximum power according the present invention, the current control unit thereof references to the preset current difference and the operation being load increase or decrease to figure out a cycling period of the gate signal for generating the cycling period signal, and sets the duty period of the gate signal to generate required duty period signal based on the output current changing between 0 and a preset current peak value.

In the preferred embodiment of a circuit for tracking a photo-voltaic array maximum power according the present invention, the current control unit thereof references to the cycling period before the operation being performed and the preset current difference to add or deduct a time difference for updating the cycling period, and the time difference is time of an average of said output current exactly adding or deducting the preset current difference after performing the operation.

From the preceding statements, it can be understood that the conventional method of perturbation and observation for tracking the maximum power has to apply the multiplier to figure out the power of the photo-voltaic array; instead, the method of the present invention performs the function of tracking the maximum power simply with the designed requirements being reached without the multiplier such that the fabricating cost for the tracking device is lowered and the available processing time is increased. Further, comparing to the method of gain conductivity, it has to calculate G and ΔG in the method of gain conductivity so it needs the divider for calculating G=i/v and ΔG=di/dv. However, it is not necessary for the method of the present invention to use any multipliers and dividers such that the cost is lowered and the available processing time is increased.

Therefore, a method and a circuit for tracking maximum power of a photo-voltaic array according to the present invention with which the calculating processes for tracking the maximum power does not need the multiplier to estimate the output power $P_{PV}$ of the photo-voltaic array such that the circuit for tracking the maximum power of the photo-voltaic array can be simplified and is capable of being joined to the pulse width modulation circuit to form an integrated circuit with a function of tracking the maximum power.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 6:
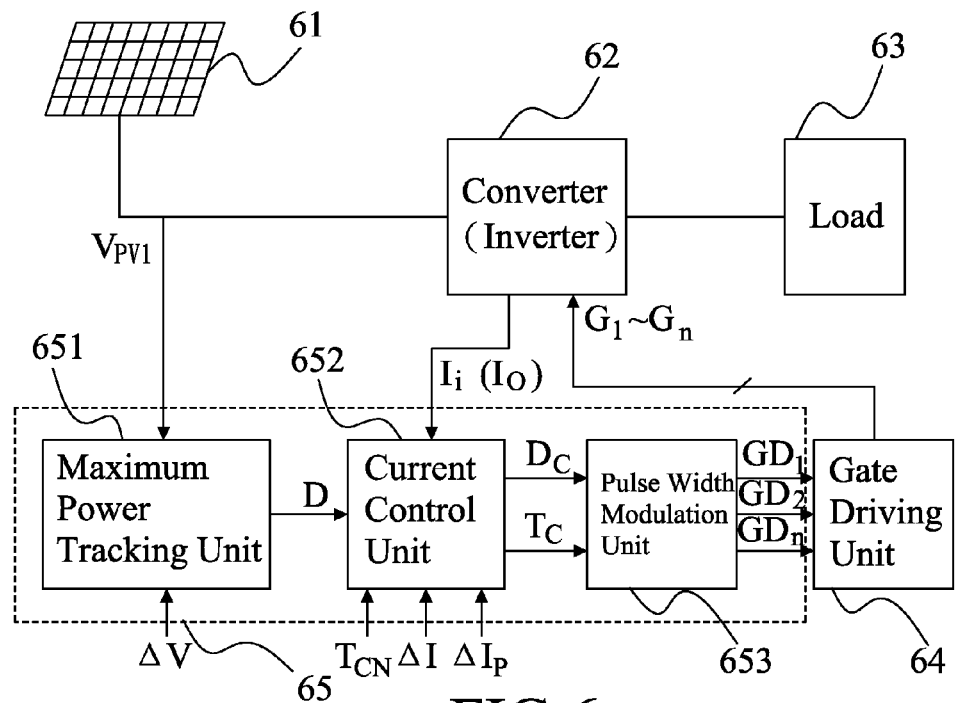
FIG. 6 is a block diagram of the solar power system according to a preferred embodiment of the present invention.

Referring to FIG. 6, a block diagram of a preferred embodiment of the solar power system according to the present invention is illustrated. The solar power system comprises a photo-voltaic array maximum power tracking circuit 65, which further comprises a maximum power tracking unit 651, a current control unit 652, and a pulse width modulation unit 653, to generate gate signals $GD_1$~$GD_n$ with modulating pulse width so as to control a gate driving unit 64 to produce gate driving signals $G_1$~$G_n$ capable of driving the converter 62 to track the power of the photo-voltaic array 61 during the power being supplied to a load 63.

Wherein, the operation process of the maximum power tracking unit 651 for tracking the maximum power is not necessary to rely on a multiplier to estimate the output power $P_{PV}$ of the photo-voltaic array anymore. Instead, a current difference $\Delta I$ is preset when the maximum power tracking unit 651 cooperates with the current control unit 652 to perform the operation of load increase/decrease, a voltage difference between the output voltages $V_{PV1}$ and $V_{PV2}$ of the photo-voltaic array, which are detected before and after the system performing the load increase/decrease respectively, and the photo-voltaic array 61 being operated at zone A or Zone B is determined based on that if the value of the voltage difference between the output voltages $V_{PV1}$ and $V_{PV2}$ reaches a preset voltage difference $\Delta V$. Thus, the next step being the operation of load increase or the operation of load decrease can be decided accordingly such that the operation point of the photo-voltaic array 61 is capable of moving toward the maximum power point $D_M$ on the photo-voltaic characteristic curve as shown in FIG. 3 and then performing the perturbation at the vicinity of the maximum power point $D_M$.

Figure 1:
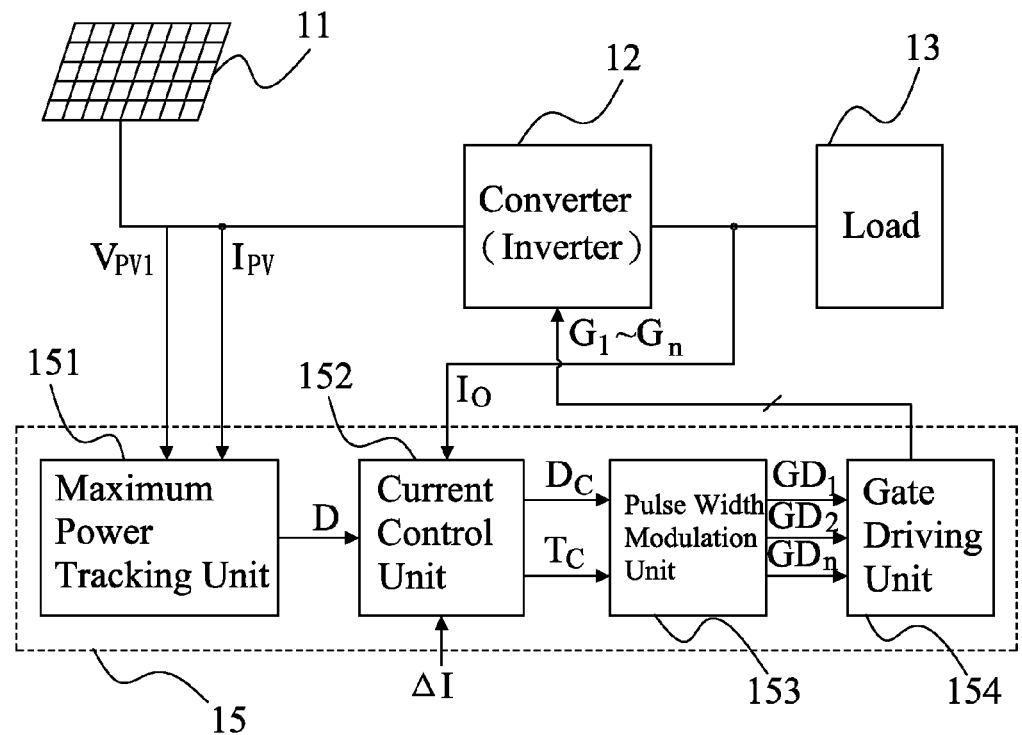
FIG. 1 is a block diagram of the conventional solar power system.
Figure 2:
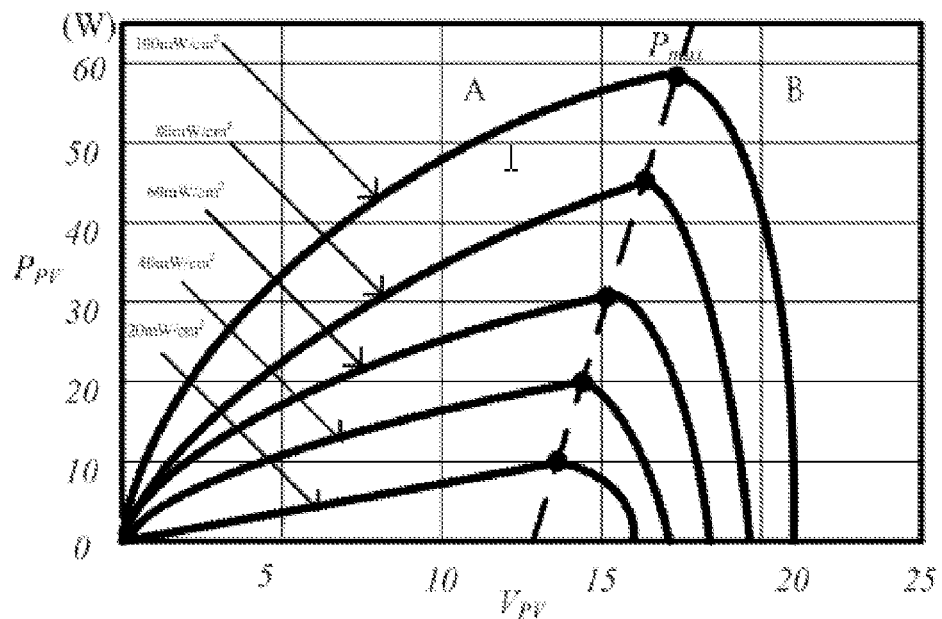
FIG. 2 is a graph illustrating the photo-voltaic characteristic curves of the conventional photo-voltaic array.
Figure 3:
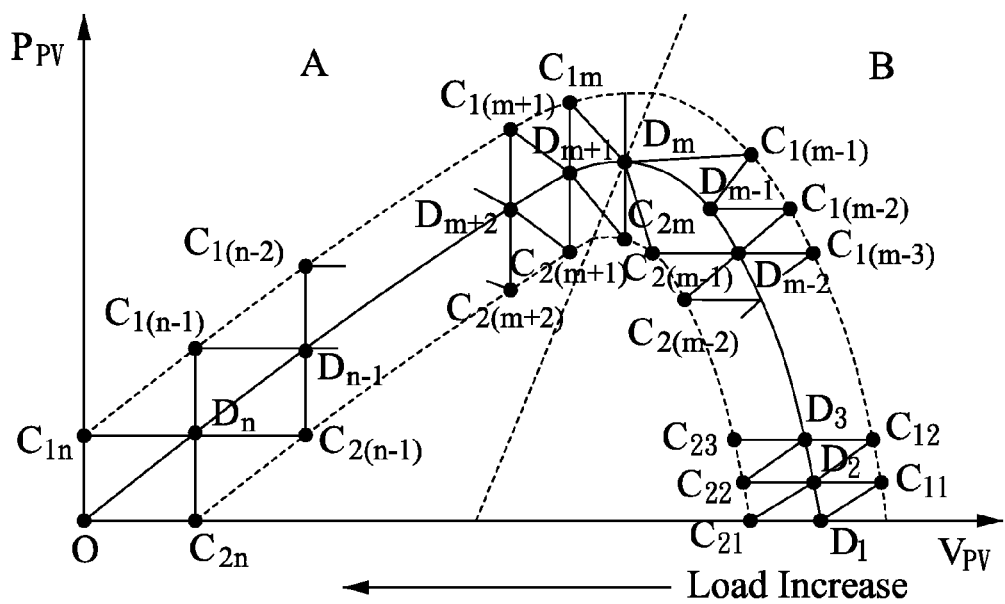
FIG. 3 is a graph illustrating the conventional method of perturbation and observation for tracking the maximum power of the photo-voltaic array.
Figure 5:
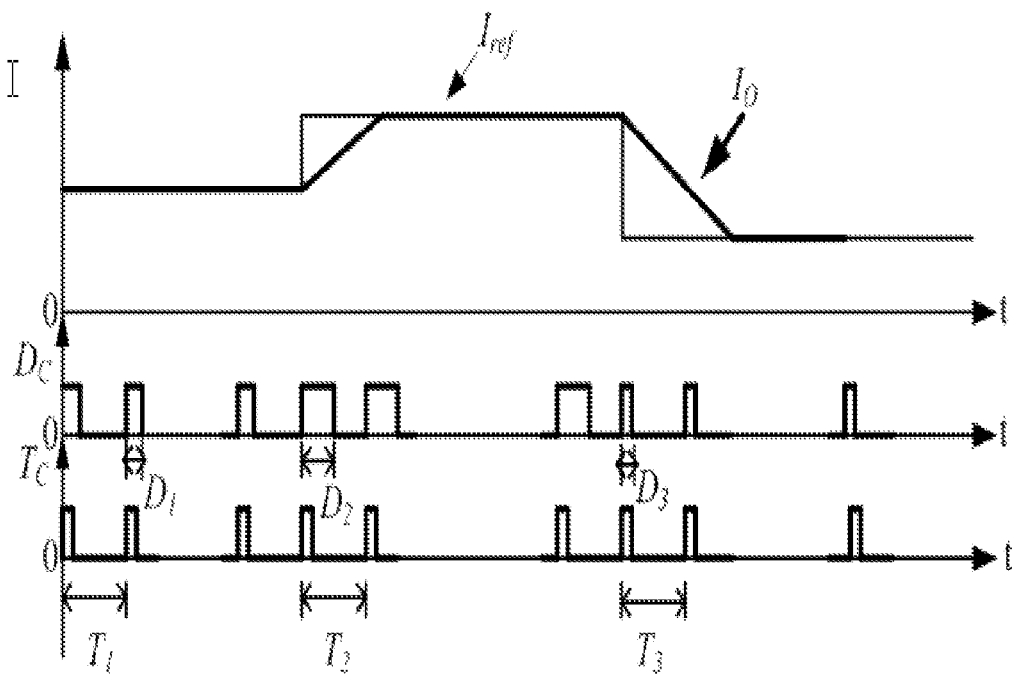
FIG. 5 is a diagram illustrating the operational timing of the conventional solar power system.
Figure 4:
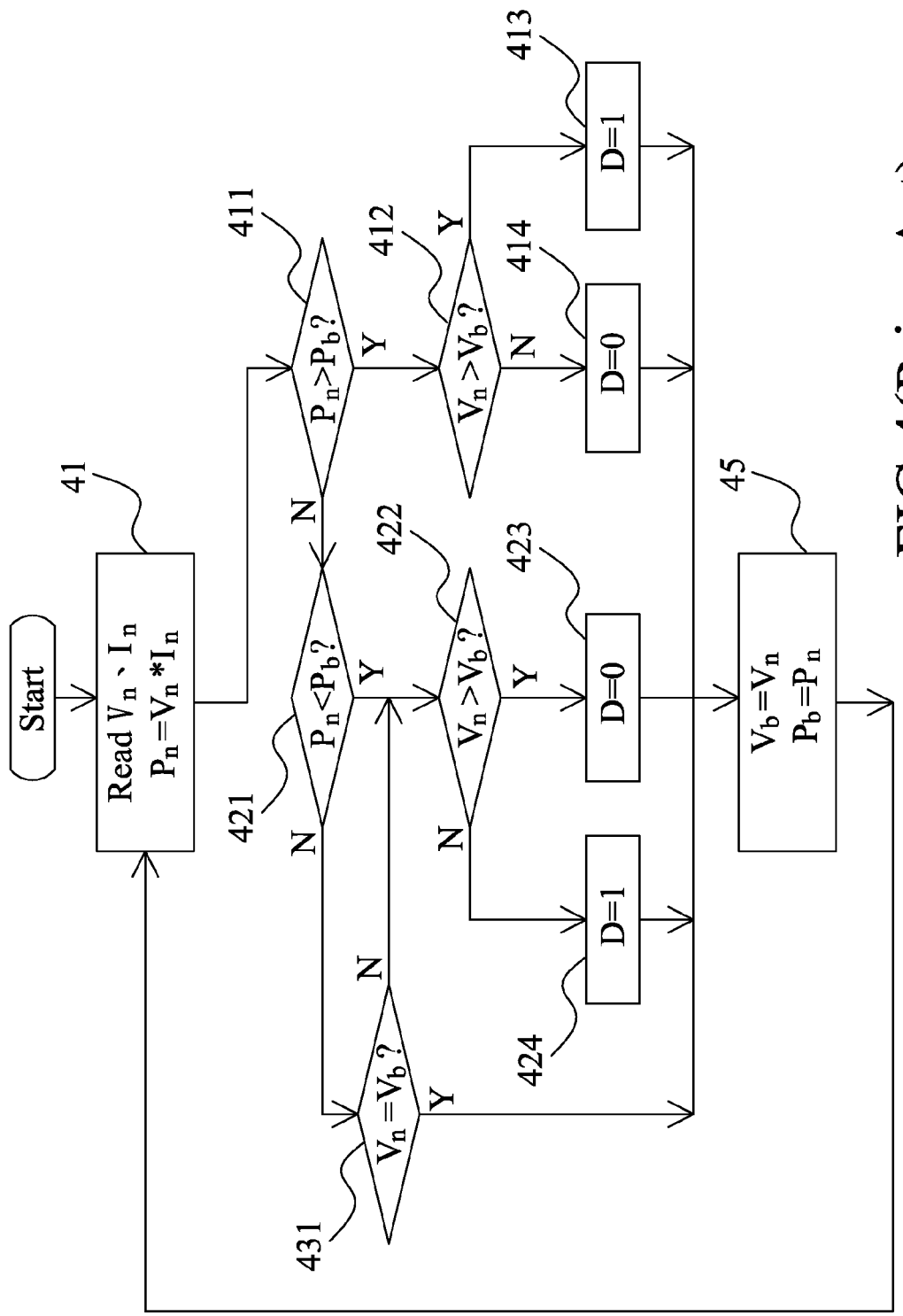
FIG. 4 is a flowchart illustrating the operational process of the conventional method of perturbation and observation for tracking the maximum power of the photo-voltaic array.

In order to determine the preset voltage difference $\Delta V$ and the preset current difference $\Delta I$ properly for the photo-voltaic array 61 capable of performing the operation of load increase/decrease with the preset current difference $\Delta I$ during the operation point of the photo-voltaic array 61 moving toward the maximum power point $D_M$ on the photo-voltaic characteristic curve as shown in FIG. 3 regardless where the operation point is, and for the value of the voltage difference between the output voltages $V_{PV1}$ and $V_{PV2}$ of the photo-voltaic array 61 detected before and after the system performing the load increase/decrease respectively reaching or not reaching the preset voltage difference $\Delta V$ to determine the photo-voltaic array 61 being operated at zone A or Zone B so as to decide next step being the operation of load increase or the operation of load decrease, the preset voltage difference $\Delta V$ and the preset current difference $\Delta I$ are preferably set the conditions stated hereinafter.

It can be seen in FIG. 3 that the operation point of the photo-voltaic array 61 moves toward $D_M$ from $D_N$ and the output voltage $V_{PV}$ of the photo-voltaic array 61 increases along with increase of the output $P_{PV}$ when the photo-voltaic array 61 operates at zone A with the load decrease. Suppose that the output currents of the photo-voltaic array 61 are $I_{PV1}$ and $I_{PV2}$ respectively before and after the load decreases, the output voltages thereof are $V_{PV1}$ and $V_{PV2}$, and the output powers thereof are $P_{PV1}$ and $P_{PV2}$. Due to the operation being load decrease and the output voltage $V_{PV}$ of the photo-voltaic array 61 increasing after the operation, the output currents $I_{PV1}$ and $I_{PV2}$ and the output voltages $V_{PV1}$ and $V_{PV2}$ of the photo-voltaic array 61 are expressed with the following equations:

$$I_{PV2} = I_{PV1} - \Delta I \quad (1)$$

$$V_{PV2} = V_{PV1} + \Delta V \quad (2)$$

$$\begin{aligned}P_{PV2} &= V_{PV2} \cdot I_{PV2} \\ &= (V_{PV1} + \Delta V) \cdot (I_{PV1} - \Delta I) \\ &= V_{PV1} \cdot I_{PV1} + \Delta V \cdot I_{PV1} - \Delta I \cdot V_{PV1} - \Delta V \Delta I \\ &= P_{PV1} + \Delta V \cdot I_{PV1} - \Delta I \cdot V_{PV1} - \Delta V \Delta I \end{aligned} \quad (3)$$

The operation is at zone A with $P_{PV2} > P_{PV1}$ during the load decreasing, equation (3) is rewritten as:

$$P_{PV2} - P_{PV1} = \Delta V \cdot I_{PV1} - \Delta I \cdot V_{PV1} - \Delta V \Delta I > 0 \quad (4)$$

The inequality of $\Delta V/\Delta I$ is derived from equation (4) and expressed as:

$$\frac{\Delta V}{\Delta I} > \frac{V_{PV1} + \Delta V}{I_{PV1}} \quad (5)$$

It is learned from equation (5) that it can be set $\Delta V/\Delta I$ greater than $(V_{PV1}+\Delta V)/I_{PV1}$ during the operation of zone A with decreasing load such that the operating point of the photo-voltaic array 61 is capable of moving toward the maximum power point Dm. If the load keeps decreasing at the time of the operating point of the photo-voltaic array 61 being adjusted to the maximum power point, it leads the working point to enter zone B with $P_{PV2} < P_{PV1}$. Under this circumference, the preset voltage difference $\Delta V$ and the preset current difference $\Delta I$ do not comply with the working condition of equation (5) and the operation should be changed to load increasing.

In FIG. 3, it can be seen that when the photo-voltaic array 61 is operated at zone B with load increasing, the working point moves toward $D_M$ from $D_1$, and the output voltage $V_{PV}$ of the photo-voltaic array 61 decreases corresponding to increase of the output power $P_{PV}$. Suppose that the output currents of the photo-voltaic array 61 are $I_{PV1}$ and $I_{PV2}$ respectively before and after the load increases, the output voltages thereof are $V_{PV1}$ and $V_{PV2}$, and the output powers thereof are $P_{PV1}$ and $P_{PV2}$. Due to the load increasing and the output voltage $V_{PV}$ of the photo-voltaic array 61 decreasing, the output currents $I_{PV1}$ and $I_{PV2}$ and the output voltages $V_{PV1}$ and $V_{PV2}$ of the photo-voltaic array 61 are expressed with the following equations:

$$I_{PV2} = I_{PV1} + \Delta I \quad (6)$$

$$V_{PV2} = V_{PV1} - \Delta V \quad (7)$$

-continued $$P_{PV2} = V_{PV2} \cdot I_{PV2} \quad (8)$$
$$= (V_{PV1} - \Delta V) \cdot (I_{PV1} + \Delta I)$$
$$= V_{PV1} \cdot I_{PV1} - \Delta V \cdot I_{PV1} + \Delta I \cdot V_{PV1} - \Delta V \Delta I$$
$$= P_{PV1} - \Delta V \cdot I_{PV1} + \Delta I \cdot V_{PV1} - \Delta V \Delta I$$

The operation is at zone B with $P_{PV2} > P_{PV1}$ during the load increasing, equation (8) is rewritten as:

$$P_{PV2} - P_{PV1} = \Delta I \cdot V_{PV1} = \Delta V \cdot I_{PV1} - \Delta V \Delta I > 0 \quad (9)$$

The inequality of $\Delta V / \Delta I$ is derived from equation (9) and expressed as:

$$\frac{\Delta V}{\Delta I} < \frac{V_{PV1}}{I_{PV1} + \Delta I} \quad (10)$$

Therefore, when the load increase is operated at zone B, $\Delta V/\Delta I$ is set to comply with the inequality (10). Similarly, if the load keeps increasing at the time of the operating point of the photo-voltaic array 61 being adjusted to the maximum power point $D_M$, it leads the working point to enter zone A with $P_{PV2} < P_{PV1}$. Under this circumference, the preset voltage difference $\Delta V$ and the preset current difference $\Delta I$ do not comply with the working condition of equation (10) and the operation should be changed to load decreasing.

It is because that when the photo-voltaic array 61 is operated at zone A, the preset voltage difference $\Delta V$ and the preset current difference $\Delta I$ have to comply with inequality (5), and when the photo-voltaic array 61 is operated at zone B, the preset voltage difference $\Delta V$ and the preset current difference $\Delta I$ have to comply with inequality (10), the preset voltage difference $\Delta V$ and the preset current difference $\Delta I$ can be set to meet the following relationship:

$$\frac{V_{PV1} + \Delta V}{I_{PV1}} < \frac{\Delta V}{\Delta I} < \frac{V_{PV1}}{I_{PV1} + \Delta I} \quad (11)$$

After the preset voltage difference $\Delta V$ and the preset current difference $\Delta I$ being set, the maximum power tracking unit 651 is able to determine the operation being at zone A or zone B simply based on change of the output voltage $V_{PV}$ of the photo-voltaic array 61 after the operation of load increase/decrease is finished such that the next step being the load increase or decrease can be decided without the multiplier estimating the output power $P_{PV}$ of the photo-voltaic array 61.

Figure 7:
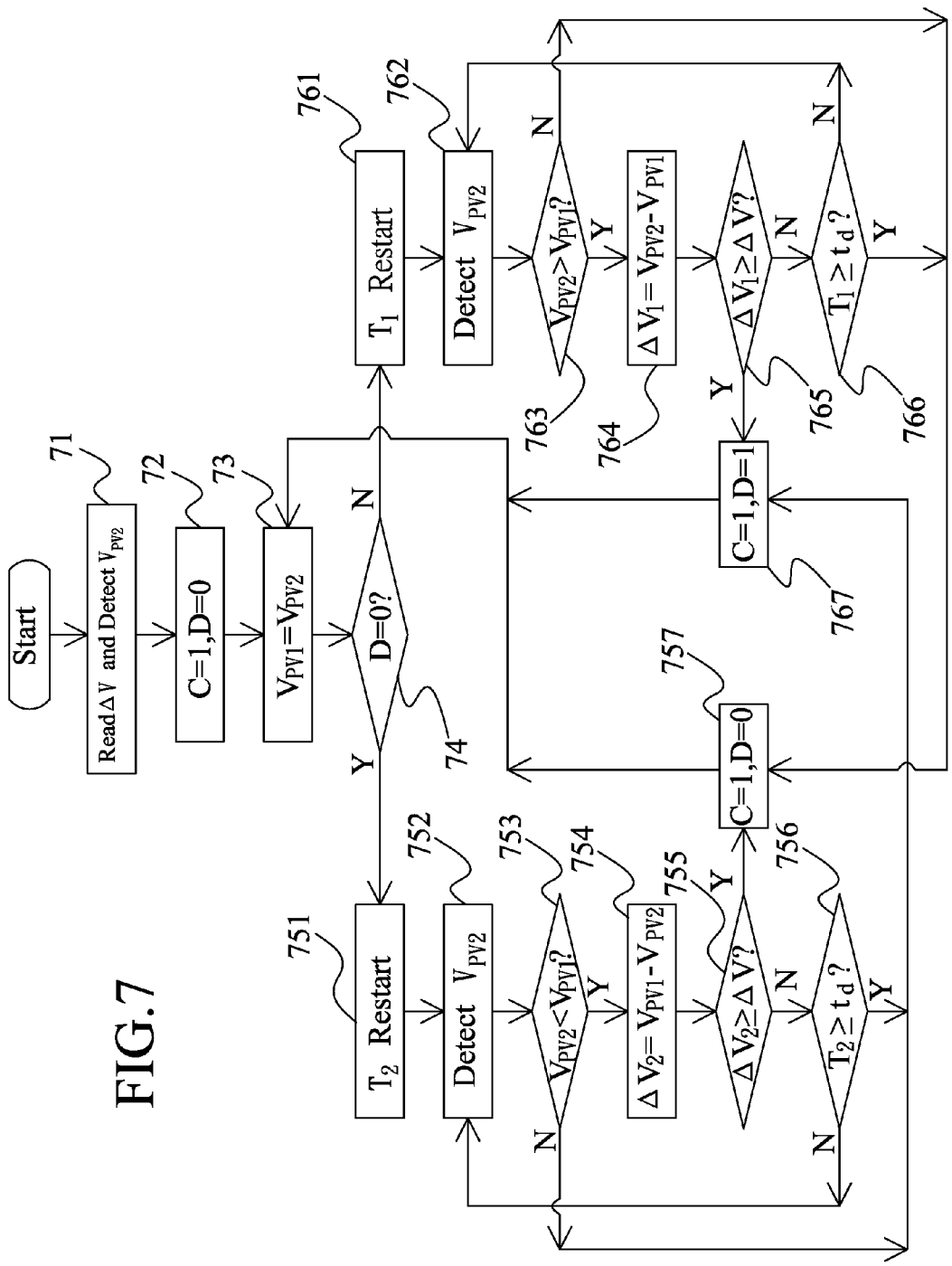
FIG. 7 is a flowchart illustrating the tracking process of the maximum power tracking unit shown in FIG. 6.

Referring to FIG. 7, firstly in step 71, the maximum power tracking unit 651 reads the preset voltage difference $\Delta V$ and detects the output voltage $V_{PV2}$ of the photo-voltaic array 61. Then, in step 72, a load increase/decrease operating flag C is set as 1, suppose that the photo-voltaic array 61 is operated at zone B, and an operation command D for load increase/decrease is set as 0 for performing the operation of load increase. Next, in step 73, the output voltage $V_{PV1}$ of the photo-voltaic array 61 is set to be equal to $V_{PV2}$ for keeping the output voltage before the load increase/decrease being operated.

In step 74, it is to determine whether the previous operation command D is 0 or not? If it is 0, it means the previous operation is load increase such that the photo-voltaic array 61 is operated at zone B and the process enters step 751 to restart the timer $T_2$ for timing. In order to determine the fact that the condition of the preset voltage difference $\Delta V$ can not be achieved when the working point of the photo-voltaic array 61 enters zone A at the time of the photo-voltaic array 61 being adjusted to the maximum power point $D_M$ and the load continuing to increase, a preset time $t_d$ of the timer $T_2$ is set, and it is determined that the working point of the photo-voltaic array 61 has already entered zone A and an operation command is issued to perform the load decrease when the preset time $t_d$ is reached.

Step 752 is performed to detect the output voltage $V_{PV2}$ of the photo-voltaic array 61 after the timer $T_2$ restarts for timing, and in step 753, it is to determine if the output voltage $V_{PV2}$ of the photo-voltaic array 61 is less than that in the previous state as expected. If it is not what is expected, it means the working point of the photo-voltaic array 61 probably has entered zone A because of change in illumination, and step 767 should be performed to issue an operation command of load decrease and to set the load increase/decrease operating flag C. On the contrary, step 754 is performed to figure out change of the output voltage of the photo-voltaic array 61, and in step 755, it is to determine if change of the output voltage is not less than the preset voltage difference $\Delta V$.

If the result determined in step 755 is "Yes", it means the photo-voltaic array 61 is still operated at zone B, and the process should enter step 757 to issue an operation command of load increasing and to set the load increase/decrease operating flag C. On the contrary, if the result determined in step 755 is "No", step 756 is performed to determine if the preset time $t_d$ of the timer $T_2$ is reached. In case of the preset time $t_d$ being reached, it means that the working point of the photo-voltaic array 61 probably has moved to zone A from zone B such that step 767 should be performed to issue the operation command of load decrease and to set the load increase/decrease operating flag C. Otherwise, the process returns to step 752 to detect change of the output voltage $V_{PV2}$ of the photo-voltaic array 61 till the change not less than the preset voltage difference $\Delta V$ or the preset time $t_d$ of the timer $T_2$ being reached.

When it is determined that the previous operation command D for load increase or decrease is not 0 in step 74, it means that the previous operation is load decrease and the photo-voltaic array 61 is operated at zone A such that the process enters step 761 to restart the timer $T_1$ for timing. In order to determine the fact that the condition of the preset voltage difference $\Delta V$ can not be achieved when the working point of the photo-voltaic array 61 enters zone B at the time of the photo-voltaic array 61 being adjusted to the maximum power point $D_M$ and the load continuing to decrease, a preset time $t_d$ of the timer $T_1$ is set, and it is determined that the working point of the photo-voltaic array 61 has already entered zone B and an operation command is issued to perform the load increase when the preset time $t_d$ is reached.

Wherein, the preset time $t_d$ of the timers $T_1$ or $T_2$ is set in accordance with the magnitude of the preset current difference $\Delta I$ and the sensitivity of the photo-voltaic array 61. That is, the preset time $t_d$ at least is required to be greater than the operation time of load increase/decrease for the photo-voltaic array 61 capable of timely responding and sending out an output current which has the preset current difference from the original output current for obtaining the required preset voltage difference $\Delta V$. Of course, the preset time $t_d$ of the timer $T_1$ and the preset time $t_d$ of the timer $T_2$ can be set in different values.

Step 762 is performed to detect the output voltage $V_{PV2}$ of the photo-voltaic array 61 after the timer T1 restarts for timing, and in step 763, it is to determine if the output voltage $V_{PV2}$ of the photo-voltaic array 61 is greater than that in the previous state as expected. If it is not what is expected, it means the working point of the photo-voltaic array 61 probably has entered zone B because of change in illumination, and step 757 should be performed to issue an operation command of load increase and to set the load increase/decrease operating flag C. On the contrary, step 764 is performed to figure out change of the output voltage of the photo-voltaic array 61, and in step 765, it is to determine if the change of the output voltage is not less than the preset voltage difference $\Delta V$.

If the result determined in step 765 is "Yes", it means that the photo-voltaic array 61 is still operated at zone A, and the process should enter step 767 to issue an operation command for load decreasing and to set the load increase/decrease operating flag C. On the contrary, if the result determined in step 765 is "No", step 766 is performed to determine if the preset time $t_d$ of the timer $T_1$ is reached. In case of the preset time $t_d$ being reached, it means that the operation of the photo-voltaic array 61 probably has moved to zone B from zone A such that step 757 should be performed to issue the operation command for load increase and to set the load increase/decrease operating flag C. Otherwise, the process returns to step 762 to detect the change of the output voltage $V_{PV2}$ of the photo-voltaic array 61 continuously till the change not less than the preset voltage difference $\Delta V$ or the preset time $t_d$ of the timer $T_1$ being reached.

The current control unit 652 in FIG. 6 couples with the maximum power tracking unit 651 to generate a cycling period signal $T_C$ and a duty period signal $D_C$ according to the output current $I_{PV}$ of the photo-voltaic array 61, the preset current difference $\Delta I$ and the operation command for load increase/decrease for the pulse width modulation unit 653 which couples with the current control unit 652 to generate the gate signals $G_1$~$G_n$. The current control unit 652 controls the load increase or decrease with a current feedback closed-loop mode or with an open-loop mode shown in FIGS. 8A to 11B.

Figure 8A:
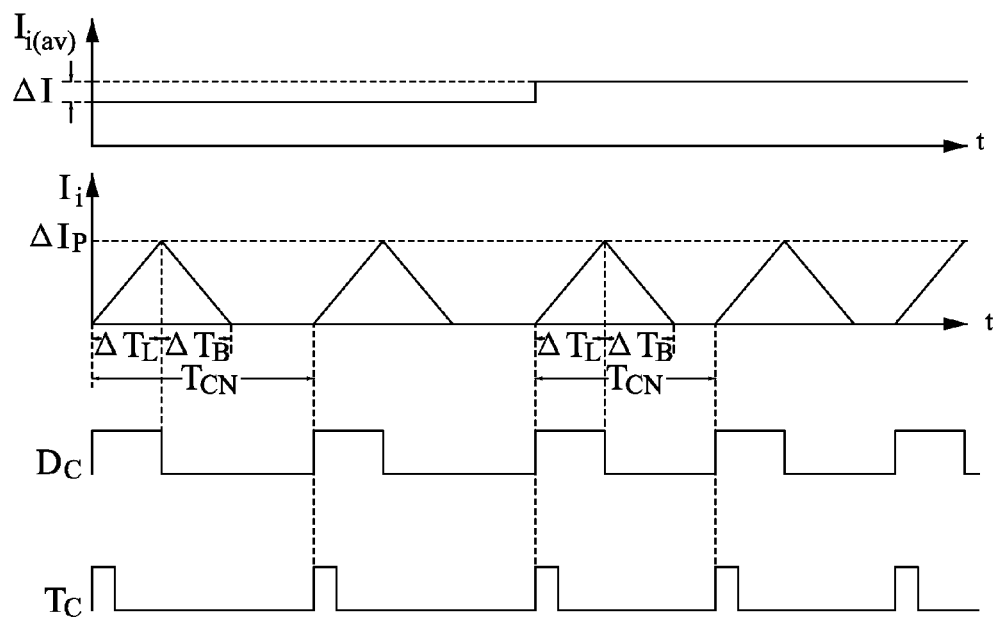
FIG. 8A is a diagram illustrating the wave form of the current at the input end of the boost converter controlled by the current control unit shown in FIG. 6 for load increase.
Figure 8B:
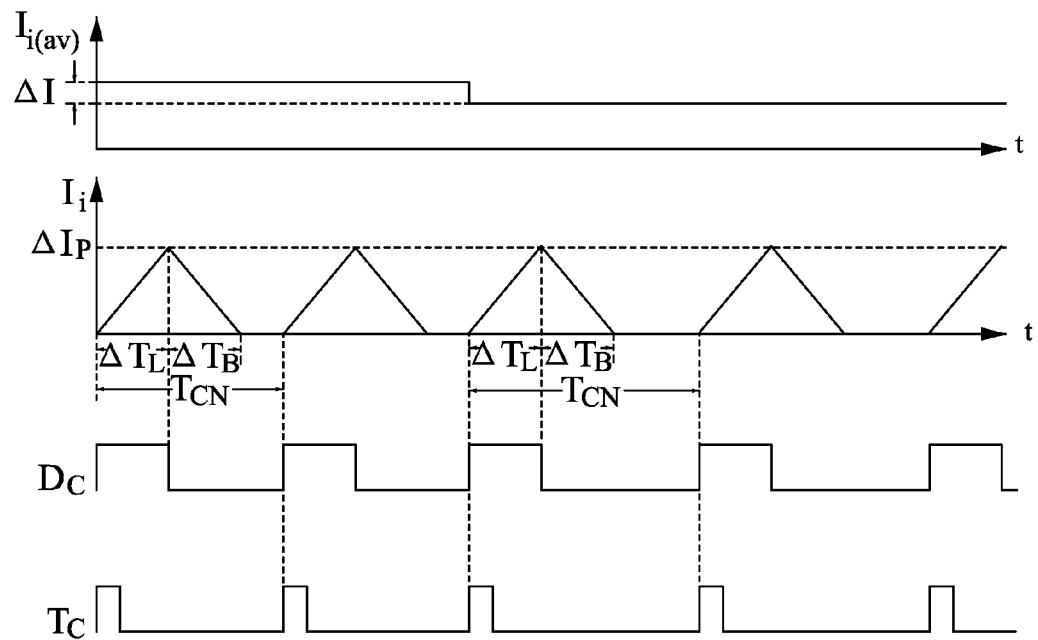
FIG. 8B is a diagram illustrating the wave form of the current at the input end of the boost converter controlled by the current control unit shown in FIG. 6 for load decrease.

Referring to FIGS. 8A and 8B, the wave form of the current at the input end of the boost converter controlled by the current control unit 652 in FIG. 6 for load increase and decrease are illustrated respectively. The current control unit 652 references to the preset current difference $\Delta I$ and the operation being load increase or load decrease to figure out the cycling period $T_{CN}$ of the generated gate signals; the cycling period signal $T_C$ is generated based on the cycling period $T_{CN}$; the input end current I, of, such as, the boost converter 62 (i.e., the output current $I_{PV}$ of the photo-voltaic array 61) changing between 0 and a preset current peak value $\Delta I_P$ is utilized to set the duty periods of the gate signals $G_1$~$G_n$ for generating required duty period signal $D_C$.

Wherein, due to the preset current peak value $\Delta I_P$ is constant, time $\Delta T_L$ for the input end current $I_i$ of the boost converter 62 rising from 0 to the preset current peak value $\Delta I_P$ and time $\Delta T_B$ for the input end current $I_i$ of the boost converter 62 descending from the preset current peak value $\Delta I_P$ to 0 keep unchanging before and after the operation of load increase or decrease; the required preset current difference $\Delta I$ during the operation of load increase or decrease is obtained via increase or decrease of the cycling period $T_{CN}$ which generates the cycling period signal $T_C$. For instance, the load increase for the input end current $I_i$ of the converter 62 shown in FIG. 8A is achieved with the cycling period $T_{CN}$ before the operation of load increase being deducted a time difference $\Delta T$ figured out referencing to the preset current difference $\Delta I$. The load decrease for the input end current $I_i$ of the converter 62 shown in FIG. 8B is achieved with the cycling period $T_{CN}$ before the operation of load decrease being added a time difference $\Delta T$ figured out referencing to the preset current difference $\Delta I$. The preceding time difference $\Delta T$ is the time of the average output current $I_{PV}$ of the photo-voltaic array 61 (i.e., the input end current $I_{i(av)}$ of the converter 62) increasing or decreasing the preset current difference $\Delta I$. The operation process is described hereinafter with FIG. 9.

Figure 9:
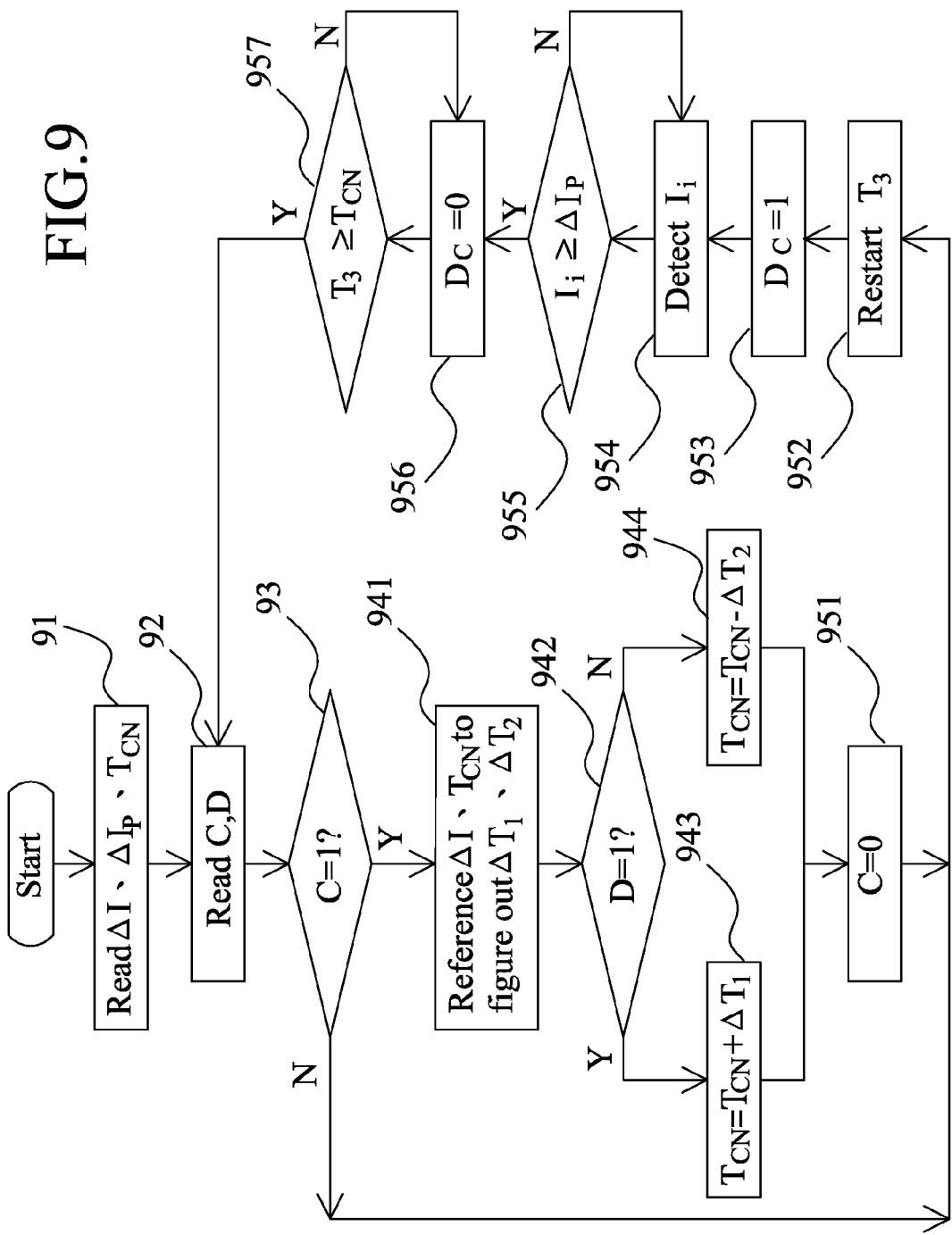
FIG. 9 is a flowchart illustrating the current control unit shown in FIG. 6 performing the process of increasing or decreasing load.

Referring to FIG. 9, step 91 is to read the preset current difference $\Delta I$, the preset current peak value $\Delta I_P$ and the preset cycling period $T_{CN}$; step 92 is to read the load increase/decrease operating flag C and the operation command D for load increase/decrease output by the maximum power tracking unit 651; step 93 is to determine if the load increase/decrease operating flag C is set as 1; in case of the load increase/decrease operating flag C being not set as 1, it means that no load increase or decrease is required and step 952 is performed directly to maintain the original cycling period $T_{CN}$; on the contrary, step 941 is performed to reference to the preset current difference $\Delta I$ and the preset cycling period $T_{CN}$ to figure out the time differences $\Delta T_1$, $\Delta T2$ required for increasing or decreasing the current difference $\Delta I$; then step 942 is performed according to the operation command D to determine that the operation is load increase or load decrease; next, in step 943 and step 944 respectively, the calculated time differences $\Delta T_1$, $\Delta T_2$ are referenced to adjust the cycling period $T_{CN}$ for the load decrease and the load increase; further, in step 951, the load increase/decrease operating flag C is reset.

In step 952, a timer $T_3$ is Restarted to count time; then, step 953 is performed to set the duty signal $D_C$ as 1; next, step 954 is performed to detect the input end current $I_i$ of the converter 62; further, step 955 is performed to determine if the input end current $I_i$ of the converter 62 reaches the preset current peak value $\Delta I_P$, and continue till the input end current $I_i$ of the converter 62 reaching the preset current peak value $\Delta I_P$. Afterwards, step 956 is performed to set the duty signal $D_C$ as 0; then, step 957 is performed to determine if the counted time of the timer $T_3$ reaches the cycling period $T_{CN}$ and continue till the counted time of the timer $T_3$ reaching the cycling period $T_{CN}$. The cycling period signal $T_C$ can be generated at the time of the timer $T_3$ starting to count time.

Figure 10A:
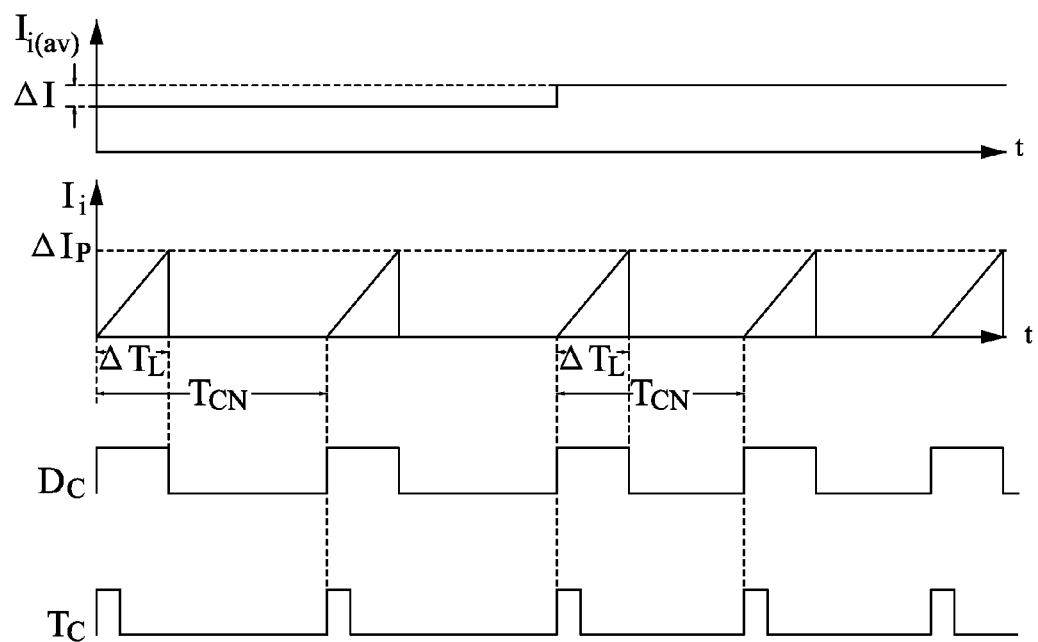
FIG. 10A is a diagram illustrating the wave form of the current at the input end of the buck converter controlled by the current control unit shown in FIG. 6 for load increase.
Figure 10B:
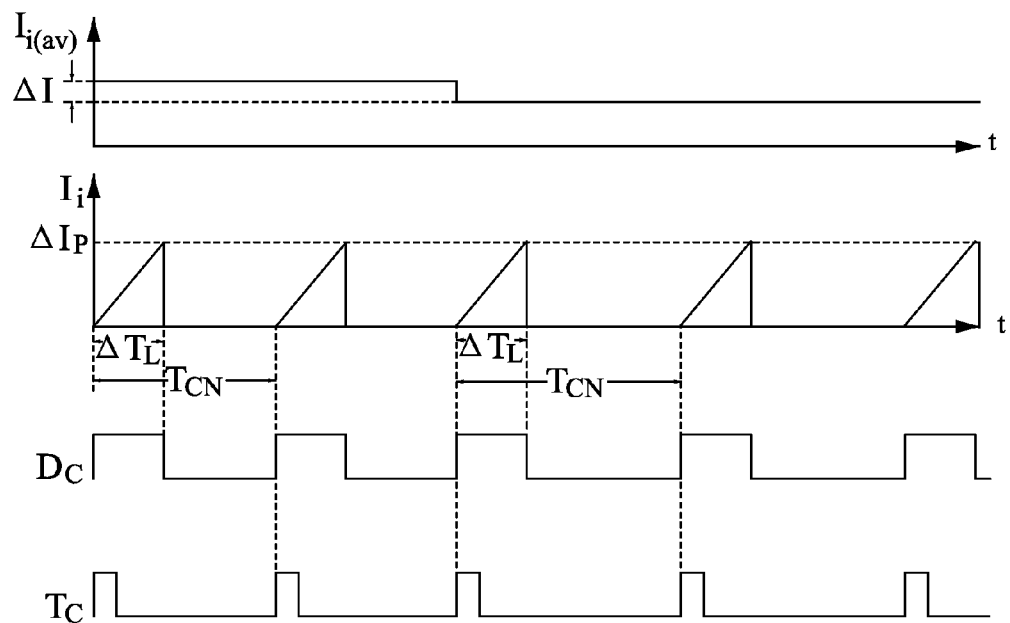
FIG. 10B is a diagram illustrating the wave form of the current at the input end of the buck converter controlled by the current control unit shown in FIG. 6 for load decrease.

Referring to FIGS. 10A and 10B, the wave form of the current at the input end of the buck converter controlled by the current control unit 652 in FIG. 6 for load increase and decrease are illustrated respectively. The current control unit 652 references to the preset current difference $\Delta I$ and the operation being load increase or load decrease to figure out the cycling period $T_{CN}$ of the generated gate signals; the cycling period signal $T_C$ is generated based on the cycling period $T_{CN}$; the input end current $I_i$ of, such as, the buck converter 62 (i.e., the output current $I_{PV}$ of the photo-voltaic array 61) changing between 0 and a preset current peak value $\Delta I_P$ is utilized to set the duty periods of the gate signals $G_1$~$G_n$ for generating required duty period signal $D_C$.

Wherein, the load increase for the input end current $I_i$ of the converter 62 shown in FIG. 10A is achieved with the cycling period $T_{CN}$ before the operation of load increase being deducted a time difference $\Delta T$ figured out referencing to the preset current difference $\Delta I$. The load decrease for the input end current $I_i$ of the converter 62 shown in FIG. 10B is achieved with the cycling period $T_{CN}$ before the operation of load decrease being added a time difference $\Delta T$ figured out referencing to the preset current difference $\Delta I$. The preceding time difference $\Delta T$ is the time of the average output current $I_{PV}$ of the photo-voltaic array 61 (i.e., the input end current $I_{i(av)}$ of the converter 62) increasing or decreasing the preset current difference $\Delta I$. The operation process is the same as that shown in FIG. 9.

Figure 11A:
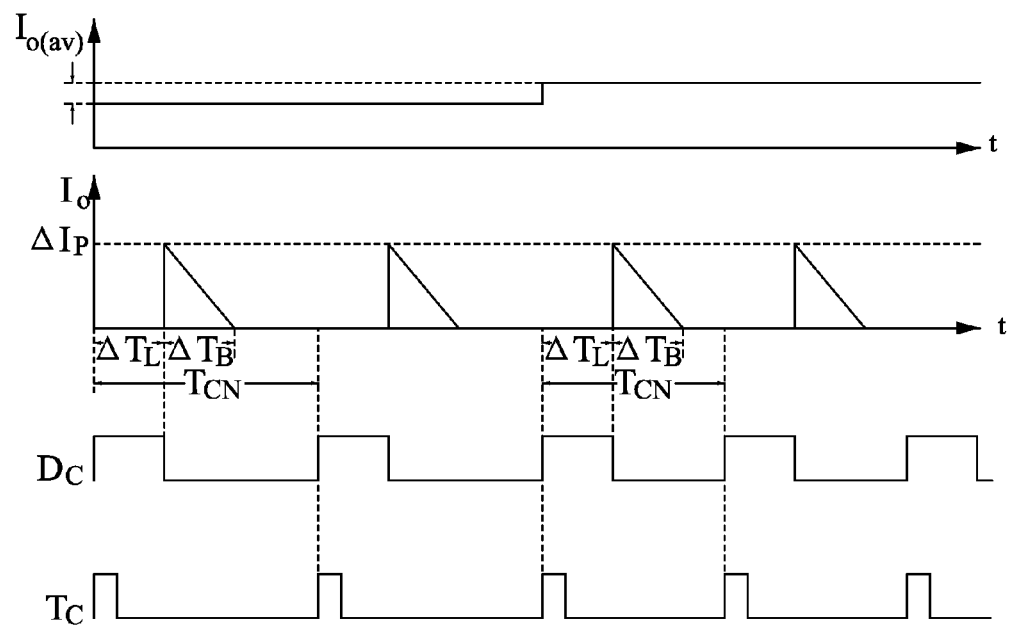
FIG. 11A is a diagram illustrating the wave form of the current at the output end of the boost converter controlled by the current control unit shown in FIG. 6 for load increase.
Figure 11B:
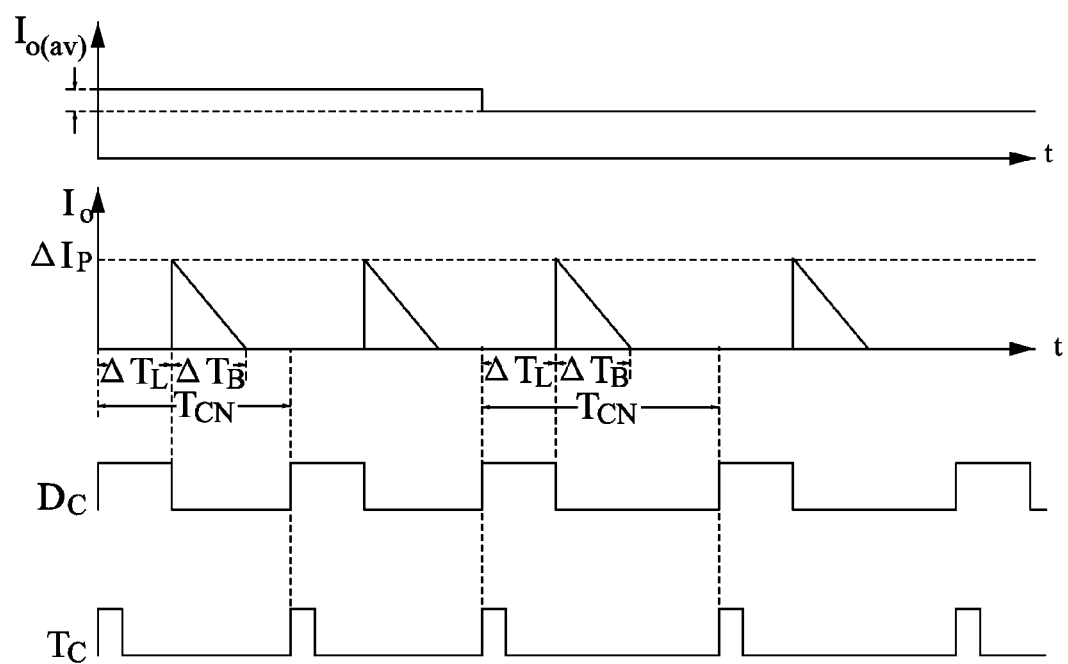
FIG. 11B is a diagram illustrating the wave form of the current at the output end of the boost converter controlled by the current control unit shown in FIG. 6 for load decrease.

Referring to FIGS. 11A and 11B, the wave form of the current at the output end of the boost converter controlled by the current control unit 652 in FIG. 6 for load increase and decrease are illustrated respectively. The current control unit 652 references to the preset current difference ΔI and the operation being load increase or load decrease to figure out the cycling period $T_{CN}$ of the generated gate signals as well; the cycling period signal $T_C$ is generated based on the cycling period $T_{CN}$; the output end current $I_o$ of like the boost converter 62 (the output end current $I_o$ is proportional to the output current $I_{PV}$ of the photo-voltaic array 61 with a $K_i$ value) changing between 0 and a preset current peak value $\Delta I_P$ is utilized to set the duty periods of the gate signals $G_1 \sim G_n$ for generating required duty period signal $D_C$.

Wherein, the load increase for the output end current $I_o$ of the converter 62 shown in FIG. 11A (i.e., the load increase for the output current $I_{PV}$ of the photo-voltaic array 61) is achieved with the cycling period $T_{CN}$ before the operation of load increase being deducted a time difference ΔT figured out referencing to the preset current difference ΔI. The load decrease for the output end current $I_o$ of the converter 62 shown in FIG. 11B (i.e., the load decrease for the output current $I_{PV}$ of the photo-voltaic array 61) is achieved with the cycling period $T_{CN}$ before the operation of load decrease being added a time difference ΔT being figured out referencing to the preset current difference ΔI. The principle of the operation process is similar to that shown in FIG. 9.

While the invention has been described with reference to a preferred embodiment thereof, it is to be understood that modifications or variations may be easily made without departing from the spirit of this invention which is defined by the appended claims.

What is claimed is:

1. A method for tracking maximum power of a photo-voltaic array, which is suitable for tracking a power of the photo-voltaic array supplied to a load, comprising following steps:
    detecting an output voltage of said photo-voltaic array before performing an operation of load increase/decrease;
    performing said operation according to a preset current difference;
    detecting said output voltage after performing said operation;
    wherein when said operation is for load increase with said output voltage detected after performing said operation being less than said output voltage before performing said operation with a value not less than a preset voltage difference during a preset time, a next operation is set for load increase;
    when said operation is for load increase with said output voltage detected after performing said operation being not less than said output voltage before performing said operation during said preset time, or said output voltage detected after performing said operation being less than said output voltage before performing said operation but still not reaching said preset voltage difference after said preset time, said next operation is set for load decrease;
    when said operation is for load decrease with said output voltage detected after performing said operation being greater than said output voltage before performing said operation with a value not less than said preset voltage difference during said preset time, said next operation is set for load decrease; and
    when said operation is for load decrease with said output voltage detected after performing said operation being not greater than said output voltage before performing said operation during said preset time, or said output voltage detected after performing said operation being greater than said output voltage before performing said operation but still not reaching said preset voltage difference after said preset time, said next operation is set for load increase.

2. The method for tracking maximum power of a photo-voltaic array as defined in claim 1 wherein said preset current difference and said preset voltage difference are set to meet a following relationship:

$$\frac{V_{PV1} + \Delta V}{I_{PV1}} < \frac{\Delta V}{\Delta I} < \frac{V_{PV1}}{I_{PV1} + \Delta I}$$

and $V_{PV1}$ represents the output voltage of said photo-voltaic array, $I_{PV1}$ represents the output current of said photo-voltaic array, ΔV represents said preset voltage difference, and ΔI represents said preset current difference in the preceding relationship.

3. The method for tracking maximum power of a photo-voltaic array as defined in claim 1, wherein said preset time is set according to magnitude of said preset current difference and sensitivity of said photo-voltaic array.

4. The method for tracking maximum power of a photo-voltaic array as defined in claim 1, wherein said operation comprises following steps:
    referencing to said preset current difference and said operation being load increase or decrease to figure out a cycling period of a pulse width modulation;
    detecting an output current of said photo-voltaic array; and
    setting a duty period of said pulse width modulation based on said output current changing between 0 and a preset current peak value.

5. The method for tracking maximum power of a photo-voltaic array as defined in claim 4 wherein a step for figuring out said cycling period is to reference to said cycling period before said operation being performed and said preset current difference to add or deduct a time difference for updating said cycling period, and said time difference is a time of an average of said output current exactly adding or deducting said preset current difference after performing said operation.

6. A photo-voltaic array maximum power tracking circuit, which is suitable for generating a gate signal of a pulse width modulation with said gate signal controlling a gate driving unit to drive a converter for tracking a power of a photo-voltaic array supplying to a load, comprising:
    a maximum power tracking unit for detecting an output voltage of said photo-voltaic array before an operation of load increase/decrease being performed, issuing a command for performing said operation, and detecting an output voltage of said photo-voltaic array after said operation being performed, wherein when said operation is for load increase and said output voltage detected after said operation is less than said output voltage before said operation with a value not less than a preset voltage difference during a preset time, a next operation is set for load increase; when said operation is for load increase with said output voltage detected after said operation being not less than said output voltage before said operation during said preset time, or said output voltage detected after said operation being less than said output voltage before said operation but still not reaching said preset voltage difference after said preset time, said next operation is set for load decrease; when said operation is for load decrease with said output voltage detected after said operation being greater than said output voltage before said operation with a value not less than said preset voltage difference during said preset time, said next operation is set for load decrease; and when said operation is load decrease with said output voltage detected after said operation being not greater than said output voltage before said operation during said preset time, or said output voltage detected after said operation being greater than said output voltage before said operation but still not reaching said preset voltage difference after said preset time, said next operation is set for load increase;

a current control unit coupling said maximum power tracking unit for generating a cycling period signal and a duty period signal according to an output current of said photo-voltaic array, a preset current difference and said operation; and a pulse width modulation unit coupling said current control unit to generate said gate signal according to said cycling period signal and said duty period signal.

7. The photo-voltaic array maximum power tracking circuit as defined in claim 6, wherein said preset current difference and said preset voltage difference are set to meet a following relationship:

$$\frac{V_{PV1} + \Delta V}{I_{PV1}} < \frac{\Delta V}{\Delta I} < \frac{V_{PV1}}{I_{PV1} + \Delta I}$$

and $V_{PV1}$ represents the output voltage of said photo-voltaic array, $I_{PV1}$ represents the output current of said photo-voltaic array, $\Delta V$ represents said preset voltage difference, and $\Delta I$ represents said preset current difference in the preceding relationship.

8. The photo-voltaic array maximum power tracking circuit as defined in claim 6, wherein said preset time is set according to magnitude of said preset current difference and sensitivity of said photo-voltaic array.

9. The photo-voltaic array maximum power tracking circuit as defined in claim 6, wherein said current control unit references to said preset current difference and said operation being load increase or decrease to figure out a cycling period of said gate signal for generating said cycling period signal, and sets a duty period of said gate signal to generate required said duty period signal based on said output current changing between 0 and a preset current peak value.

10. The photo-voltaic array maximum power tracking circuit as defined in claim 9, wherein said current control unit references to said cycling period before said operation and said preset current difference to add or deduct a time difference for updating said cycling period, and said time difference is a time of an average of said output current exactly adding or deducting said preset current difference after performing said operation.

* * * * *